United States Patent [19]

Furukawa et al.

[11] 4,264,173
[45] Apr. 28, 1981

[54] LENS TUBE GUIDE FRAME FOR USE IN LENS TUBE RETRACTABLE TYPE CAMERA

[75] Inventors: Akio Furukawa, Tokyo; Kousaku Sawabe, Yokohama; Fumihiro Miyagawa, Yokohama; Hiroo Nakano, Yokohama; Atushi Tokunaga, Yamato, all of Japan

[73] Assignee: Ricoh Co., Ltd., Japan

[21] Appl. No.: 37,469

[22] Filed: May 9, 1979

[30] Foreign Application Priority Data

May 12, 1978 [JP] Japan .................................. 53-56736

[51] Int. Cl.$^3$ ............................................. G03B 17/04
[52] U.S. Cl. .................................... 354/187; 354/286
[58] Field of Search ................ 354/187, 202, 286, 288

[56] References Cited

U.S. PATENT DOCUMENTS 2,732,776  1/1956  Meixner .............................. 354/187

FOREIGN PATENT DOCUMENTS 538014  3/1957  Canada ..................................... 354/187
2404687  8/1975  Fed. Rep. of Germany ........... 354/187
2825000  12/1978 Fed. Rep. of Germany ........... 354/187

Primary Examiner—L. T. Hix
Assistant Examiner—Thomas H. Tarcza
Attorney, Agent, or Firm—McGlew and Tuttle

[57] ABSTRACT

A lens tube guide frame holds a retractable lens tube in the body of the camera and also holds a lens and a film surface in their respective correct positions for making exposures. The lens tube guide frame can be easily inserted in the body of the camera and includes a standard surface at its front inner wall opposite the open side of the lens tube guide frame to provide an exact stop for forward movement of the lens tube. The guide frame cross section is U-shaped or box-shaped, and has two projection portions directed outwards at the open rear end to engage adjacent side walls of the camera body. The lens tube guide frame, with the lens tube already in it, is inserted into the camera body through the back side when assembling, whereby the lens tube guide frame can be positioned without any adjustment.

6 Claims, 6 Drawing Figures

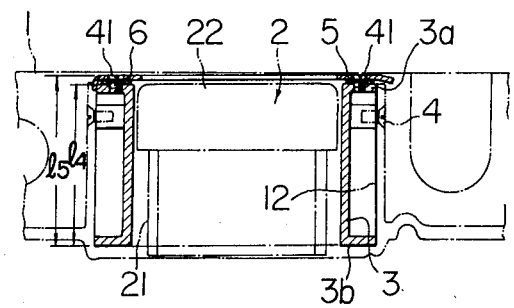
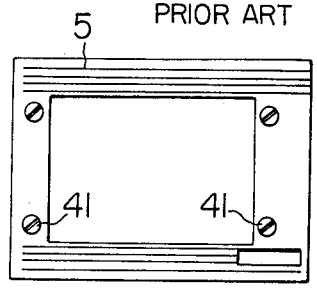
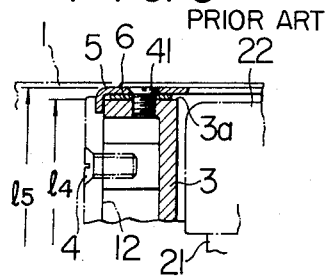
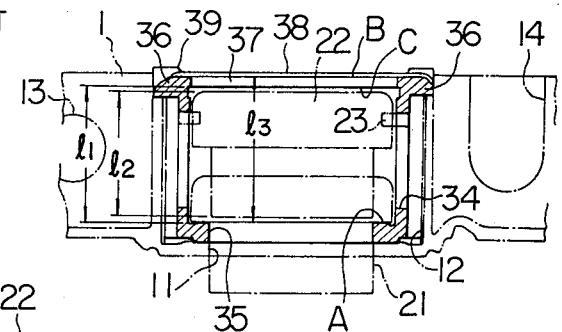
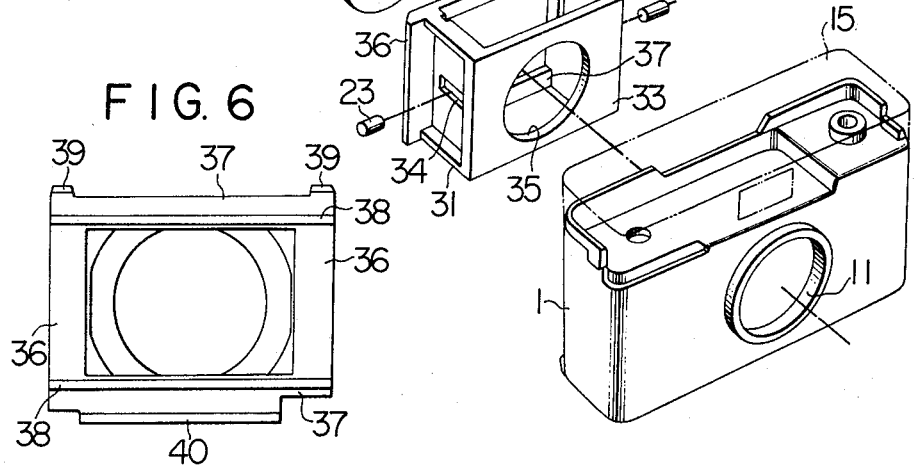

LENS TUBE GUIDE FRAME FOR USE IN LENS TUBE RETRACTABLE TYPE CAMERA

BACKGROUND OF THE INVENTION

The present invention relates to a lens tube guide frame for use in a lens tube retractable type camera, which is capable of establishing the distance between the lens and the film surface to a high degree of accuracy and can be assembled easily.

In a conventional lens tube retractable type camera, as shown in FIG. 1, a lens tube guide frame 3 is inserted in a concave light-tight box 12 formed in the body 1 of a camera and is attached to the body 1 by a screw 4. The length of such a lens tube guide frame 3 is A film receiving plate 5 is held in place on the rear end surface 3a of the lens tube guide frame 3 by four screws 41, and a lens tube 2 is inserted inside the frame 3. The distance $l_5$ between the front end surface 3b of the frame 3 and the film receiving plate 5 is adjusted while measuring the distance $l_5$ by a jig, with a washer 6 held between the rear end surface 3a and the film receiving plate 5, so that a predetermined space is maintained between the lens and the film surface when the lens tube guide frame 3 is assembled.

A conventional lens tube guide frame of the type just described has the following shortcomings: The assembly process is complicated and long. After the basic assembly of the components, a lot of time is required for adjusting the lens tube guide frame. The assembling efficiency is poor. Too many parts are necessary. The inferior ratio of the lens tube guide frame is high in production process thereof, with the scattering of size accuracy of each part multiplied. And it is difficult to maintain the relative position of the lens and the film surface with high accuracy.

SUMMARY OF THE INVENTION

It is therefore an object of the present invention to provide an improved lens tube guide frame for use in a lens tube retractable type camera.

Another object is to provide a lens tube guide frame capable of maintaining the relative position of the lens and the film surface with high accuracy.

A further object is to provide a lens tube guide frame that can be assembled and taken apart more efficiently.

A still further object is to provide a lens tube guide frame in which the shortcomings of the conventional lens tube guide frame are eliminated.

A feature of the present invention is that a precisely formed standard surface is located at an inner wall opposite an open side of a lens tube guide frame that has a U-shaped or box-shaped cross section. A film receiving surface is formed at the open end of the lens tube guide frame by horizontal bar members connecting two projection portions that are directed outwards from both sides of the rear end portion of the frame, and the lens tube guide frame is inserted from the back side of the camera body into the camera body during assembly so that the lens tube guide frame can be positioned as a unit without any adjustment.

According to the present invention, the clearance between the standard surface and an outer wall surface of the film receiving surface can be maintained to a high degree of accuracy when the lens tube guide frame is produced, and the lens tube frame can be incorporated in the body of a camera without any adjustment. Therefore, it does not require any special skill in assembling the frame in order to attain the high accuracy, and the time required for adjustment of the frame is significantly reduced. Furthermore, the number of necessary parts is also reduced. Accordingly the inferior ratio of the lens tube guide frame in the course of the production is reduced since the scattering of size accuracy of each part is not multiplied.

BRIEF DESCRIPTION OF THE DRAWINGS

FIG. 1 is a sectional plan view of a conventional lens tube guide frame.

FIG. 2 is a rear view of a film receiving plate of the lens tube guide frame of FIG. 1.

FIG. 3 is an enlarged sectional view of a fragment of the lens tube guide frame of FIG. 1.

FIG. 4 is a perspective exploded view of a lens tube retractable type camera in which the present invention is employed.

FIG. 5 is a sectional view of an embodiment of a lens tube guide frame according to the present invention.

FIG. 6 is a rear view of the lens tube guide frame of FIG. 5.

DETAILED DESCRIPTION OF THE PREFERRED EMBODIMENT

Referring to FIGS. 4 and 5, a tubular portion 21 of a lens tube 2, which is located in a light-tight box 12 behind a front plate of a camera body 1, capable of either being retracted entirely into the camera body or extending out in front of it through an opening 11. Recesses 13 and 14, which are shown in phantom, since they are not part of this invention, are disposed on opposite sides of the light-tight box 12, are film loading boxes. Above the opening 11, there is usually a box 15, also shown in phantom, for an exposure control mechanism and a view-finder mechanism.

The tubular 2 comprises the lens tube portion 21 and a lens tube supporting portion 22 in which a shutter mechanism may be located. Outside of the lens tube 2 but within the light-tight box 12, there is a lens tube guide frame 3' that typically has a U-shaped or box-shaped cross section. The lens tube guide frame 3' comprises, as shown in FIG. 4, a unitary one-piece formation of two side walls 31 and 32 that face each other, horizontal bars, 37, and an end a front wall 33 located just behind the front wall of the camera body 1, when the guide frame is inserted into the camera body. In each of the side walls 31 and 32, there is a horizontal slot 34 for guiding the lens tube 2. In addition, there are other guide members for guiding the retractable lens tube 2, and members for use with the shutter mechanism. The horizontal slot 34 is formed in the middle portion in each of the side walls 31 and 32, and in each slot 34 a pin 23 is slidably inserted, and these pins are attached to the lens tube holding portion 22 of the lens tube 2. In the front end wall 33, there is formed a hole 35 into which the tubular portion 21 fits. On the front end wall 33 around the hole 35, is a precisely formed flat surface A that serves as a stop to define the forwardmost position of the lens tube 2. Along the rear edges of the side walls 31 and 32, there are two projections 36 directed in opposite outward directions. The upper and lower ends of the projections 36 are connected by horizontal bars 37 to form a box shape so that a thin film-receiving surface is formed. The outer surface of the film-receiving surface constitutes an outer wall B on which there are disposed two parallel projected rail surfaces 38. In the upper and lower ends of the outer wall B, there are formed parallel guide rails 39 and 40. When a film (not shown) is loaded into the camera, the film is positioned between the two guide rails 39 and 40 and is brought into pressure contact with the rail surface 38 by a pressure plate (not shown).

The distance $l_3$ between the surface A of the lens tube guide frame 3' and the outer wall B is machined to a high degree of accuracy in conformtity with the requirement for a precisely predetermined distance from the lens to the film surface. Furthermore, the distance $l_1$ between the surface A and an inner wall surface C of the horizontal bars 37 of the film receiving surface is made longer than the length $l_2$ of the lens tube 2 in the optical axis direction thereof.

When the lens tube guide frame 3' and the lens tube 2 are mounted on the camera body 1, the lens tube 2 is inserted from the back side of the lens tube guide frame 3', the length $l_3$ of which is machined to a high degree of accuracy. After insertion of the lens tube 2 into the guide frame, the pins 23 are inserted into the horizontal slots 34. Furthermore, the guide members for retracting the lens tube 2 and the members for the shutter mechanism are attached. The lens tube guide frame 3' with the lens tube 2 assembled therein is appropriately made light-tight and is fixed without any adjustment by inserting the lens tube guide frame 3' into the light-tight box 12 from the back side of the camera body 1. The tubular portion 21 of the lens tube 2 is fitted into the opening 35 of the lens tube guide frame 3' and the opening 11 of the camera body to project from the front side of the camera body 1.

When the assembled lens tube 2 projects from the camera body, as indicated by the dash and dot lines in FIG. 5, the lens is in position to take photographs, and the front surface of the lens tube holding portion 22 is in contact with the standard surface A. Thus, the lens and the film surface can be set a very accurately predetermined distance apart without any adjustment when assembled.

What is claimed is:

1. A lens tube retractable type of camera comprising:
   a lens tube including a tubular portion, a lens therein having an aperture plane, and a lens tube supporting portion;
   a camera body comprising a light-tight box section and a front wall with a first aperture through which said tubular portion can extend;
   a lens guide frame that comprises a unitary one-piece formation of a front end wall with a second aperture through which said tubular portion can extend, two side walls spaced apart a distance greater than the width of said lens tube supporting portion, and two horizontal bars having rearwardly facing sides defining guide surfaces for opposite edge portions of film during exposure thereof in said camera;
   said front end wall having a precisely formed rearward-facing surface, and said lens supporting portion of said lens tube having a forwardly facing portion defining a precisely matching surface relative to said rearward-facing surface at a predetermined distance from said aperture plane, whereby said aperture plane is at a precisely predetermined distance from said film guide surfaces when said lens tube is moved forward and said tubular portion extends through both of said apertures and both of said precisely formed surfaces are in surface-to-surface contact with each other;
   means guiding and retaining said lens tube in said guide frame; and
   outwardly projecting members extending from opposite sides of said guide frame and engaging said camera body to hold said guide frame in a predetermined position in said camera body.

2. The invention as defined in claim 1 in which said precisely formed surface on the front end wall of said lens tube guide frame is spaced a predetermined distance from the said guide surfaces for said film.

3. The invention as defined in claim 1 in which said outwardly projecting portions are at the rear edges of said side walls and engage rear edges of said light-tight box.

4. The invention as defined in claim 1 comprising rails formed on the rearwardly facing surfaces of said horizontal bars to guide the film along a precisely determined path.

5. The invention as defined in claim 1 in which said horizontal bars have forwardly facing surfaces spaced from said facing surface of said front end wall by a distance greater than the overall length of said lens tube in the direction of the optical axis of said lens.

6. The invention as defined in claim 1 in which said means guiding and retaining said lens tube in said guide frame comprises:
   a pair of horizontal slots in said side walls to receive and retain said pins and to guide said lens tube thereby within a limited range of horizontal movement.

* * * * *